(12) United States Patent
Yamada

(10) Patent No.: US 11,095,796 B2
(45) Date of Patent: Aug. 17, 2021

(54) COLOR ADJUSTMENT APPARATUS AND COLOR ADJUSTMENT METHOD

(71) Applicant: CANON KABUSHIKI KAISHA, Tokyo (JP)

(72) Inventor: Michihiko Yamada, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 62 days.

(21) Appl. No.: 16/712,809

(22) Filed: Dec. 12, 2019

(65) Prior Publication Data
US 2020/0213475 A1 Jul. 2, 2020

(30) Foreign Application Priority Data
Dec. 27, 2018 (JP) .............................. JP2018-246312

(51) Int. Cl.
*H04N 1/60* (2006.01)
*G06T 11/00* (2006.01)
*G06T 7/90* (2017.01)
*H04N 9/04* (2006.01)

(52) U.S. Cl.
CPC ............ *H04N 1/6002* (2013.01); *G06T 7/90* (2017.01); *G06T 11/001* (2013.01); *H04N 9/0451* (2018.08)

(58) Field of Classification Search
CPC .. H04N 1/6002; H04N 9/0451; H04N 1/6077; H04N 1/6027; H04N 1/00023; H04N 9/3182; H04N 9/68; H04N 9/73; G06T 11/001; G06T 7/90; F21K 9/64; F21V 13/14; G02F 1/133602
See application file for complete search history.

(56) References Cited

U.S. PATENT DOCUMENTS

2018/0043257 A1* 2/2018 Stevens .................. A63F 13/79

FOREIGN PATENT DOCUMENTS

JP 2010-183487 A 8/2010
JP 2014-138249 A 7/2014

\* cited by examiner

*Primary Examiner* — Christopher Wait
(74) *Attorney, Agent, or Firm* — Canon U.S.A., Inc. IP Division

(57) ABSTRACT

Input color values corresponding to an input image are received; a color space of the input color values is converted to an LMS color space with three elements, the three elements including a long wavelength (L) element, a medium wavelength (M) element, and a short wavelength (S) element;
color values in the LMS color space are grouped into a plurality of groups based on color vision information, each of the groups including color values determined as approximate based on the color vision information;
and lightness of color values included in each of the groups is adjusted and an image output device is instructed to apply said adjusted lightness of color values to said input image.

9 Claims, 9 Drawing Sheets

FIG. 5

| R | G | B |
|---|---|---|
| 17 | 170 | 17 |
| 136 | 153 | 34 |
| 170 | 136 | 34 |
| 255 | 34 | 51 |
| 17 | 102 | 255 |
| 34 | 0 | 255 |
| 102 | 0 | 170 |
| 153 | 0 | 255 |
| 0 | 153 | 17 |
| 0 | 255 | 34 |
| 153 | 204 | 34 |
| 170 | 119 | 34 |
| 238 | 51 | 51 |

FIG. 6

| R | G | B | L | M | S | Ld | Md | Sd |
|---|---|---|---|---|---|---|---|---|
| 17 | 170 | 17 | 0.178009 | 0.111069 | 0.000859 | 0.178009 | 0.088298 | 0.000859 |
| 136 | 153 | 34 | 0.184692 | 0.09663 | 0.000933 | 0.184692 | 0.091665 | 0.000933 |
| 170 | 136 | 34 | 0.180716 | 0.08199 | 0.000842 | 0.180716 | 0.089604 | 0.000842 |
| 17 | 102 | 255 | 0.095345 | 0.073062 | 0.01556 | 0.095345 | 0.066169 | 0.01556 |
| 34 | 0 | 255 | 0.038762 | 0.036832 | 0.015309 | 0.038762 | 0.038129 | 0.015309 |
| 102 | 0 | 170 | 0.038182 | 0.019091 | 0.006193 | 0.038182 | 0.02645 | 0.006193 |
| 153 | 0 | 255 | 0.092842 | 0.047086 | 0.015403 | 0.092842 | 0.064746 | 0.015403 |
| 255 | 34 | 51 | 0.186972 | 0.039497 | 0.000849 | 0.186972 | 0.092677 | 0.000849 |
| 0 | 153 | 17 | 0.140311 | 0.087908 | 0.000697 | 0.140311 | 0.069624 | 0.000697 |
| 0 | 255 | 34 | 0.440415 | 0.275909 | 0.002164 | 0.440415 | 0.218508 | 0.002164 |
| 153 | 204 | 34 | 0.323102 | 0.177627 | 0.001503 | 0.323102 | 0.160198 | 0.001503 |
| 170 | 119 | 34 | 0.153566 | 0.064995 | 0.000724 | 0.153566 | 0.076152 | 0.000724 |
| 238 | 51 | 51 | 0.168577 | 0.039293 | 0.000836 | 0.168577 | 0.083648 | 0.000836 |

FIG. 7A

| R | G | B | L | M | S | Ld | Md | Sd |
|---|---|---|---|---|---|---|---|---|
| 17 | 170 | 17 | 0.178009 | 0.111069 | 0.000859 | 0.178009 | 0.088298 | 0.000859 |
| 136 | 153 | 34 | 0.184692 | 0.09663 | 0.000933 | 0.184692 | 0.091665 | 0.000933 |
| 170 | 136 | 34 | 0.180716 | 0.08199 | 0.000842 | 0.180716 | 0.089604 | 0.000842 |
| 255 | 34 | 51 | 0.186972 | 0.039497 | 0.000849 | 0.186972 | 0.092677 | 0.000849 |
| 0 | 153 | 17 | 0.140311 | 0.087908 | 0.000697 | 0.140311 | 0.069624 | 0.000697 |
| 0 | 255 | 34 | 0.440415 | 0.275909 | 0.002164 | 0.440415 | 0.218508 | 0.002164 |
| 153 | 204 | 34 | 0.323102 | 0.177627 | 0.001503 | 0.323102 | 0.160198 | 0.001503 |
| 170 | 119 | 34 | 0.153566 | 0.064995 | 0.000724 | 0.153566 | 0.076152 | 0.000724 |
| 238 | 51 | 51 | 0.168577 | 0.039293 | 0.000836 | 0.168577 | 0.083648 | 0.000836 |

FIG. 7B

| R | G | B | L | M | S | Ld | Md | Sd |
|---|---|---|---|---|---|---|---|---|
| 17 | 102 | 255 | 0.095345 | 0.073062 | 0.01556 | 0.095345 | 0.066169 | 0.01556 |
| 34 | 0 | 255 | 0.038762 | 0.036832 | 0.015309 | 0.038762 | 0.038129 | 0.015309 |
| 102 | 0 | 170 | 0.038182 | 0.019091 | 0.006193 | 0.038182 | 0.02645 | 0.006193 |
| 153 | 0 | 255 | 0.092842 | 0.047086 | 0.015403 | 0.092842 | 0.064746 | 0.015403 |

FIG. 8A

| R | G | B | L | M | S | L+M | Ld | Md | Sd | Ld+Md | ADDITION RATE | (Ld+Md)' | L' | M' | S' |
|---|---|---|---|---|---|---|---|---|---|---|---|---|---|---|---|
| 238 | 51 | 51 | 0.168577 | 0.039293 | 0.000836 | 0.20787 | 0.168577 | 0.083648 | 0.000836 | 0.252225 | -4 | 0.200193 | 0.133801 | 0.031187 | 0.000664 |
| 170 | 119 | 34 | 0.153566 | 0.064995 | 0.000724 | 0.218562 | 0.153566 | 0.076152 | 0.000724 | 0.229719 | -3 | 0.231443 | 0.154719 | 0.065483 | 0.000729 |
| 255 | 34 | 51 | 0.186972 | 0.039497 | 0.000849 | 0.226469 | 0.186972 | 0.092677 | 0.000849 | 0.279649 | -2 | 0.279649 | 0.186972 | 0.039497 | 0.000849 |
| 0 | 153 | 17 | 0.140311 | 0.087908 | 0.000697 | 0.228219 | 0.140311 | 0.069624 | 0.000697 | 0.209935 | -1 | 0.293943 | 0.196458 | 0.123086 | 0.000976 |
| 170 | 136 | 34 | 0.180716 | 0.08199 | 0.000842 | 0.262707 | 0.180716 | 0.089604 | 0.000842 | 0.27032 | 0 | 0.325193 | 0.2174 | 0.098634 | 0.001013 |
| 136 | 153 | 34 | 0.184692 | 0.09663 | 0.000933 | 0.281322 | 0.184692 | 0.091665 | 0.000933 | 0.276357 | 1 | 0.356443 | 0.238214 | 0.124632 | 0.001203 |
| 17 | 170 | 17 | 0.178009 | 0.111069 | 0.000859 | 0.289079 | 0.178009 | 0.088298 | 0.000859 | 0.266308 | 2 | 0.387693 | 0.259148 | 0.161695 | 0.00125 |
| 153 | 204 | 34 | 0.323102 | 0.177627 | 0.001503 | 0.500729 | 0.323102 | 0.160198 | 0.001503 | 0.4833 | 3 | 0.4833 | 0.323102 | 0.177627 | 0.001503 |
| 0 | 255 | 34 | 0.440415 | 0.275909 | 0.002164 | 0.716324 | 0.440415 | 0.218508 | 0.002164 | 0.658923 | 4 | 0.658923 | 0.440415 | 0.275909 | 0.002164 |

FIG. 8B

| R | G | B | L | M | S | L+M | Ld | Md | Sd | Ld+Md | ADDITION RATE | (Ld+Md)' | L' | M' | S' |
|---|---|---|---|---|---|---|---|---|---|---|---|---|---|---|---|
| 102 | 0 | 170 | 0.038182 | 0.019091 | 0.006193 | 0.057273 | 0.038182 | 0.02645 | 0.006193 | 0.064632 | -2 | 0.052656 | 0.031107 | 0.015553 | 0.005046 |
| 34 | 0 | 255 | 0.038762 | 0.036832 | 0.015309 | 0.075593 | 0.038762 | 0.038129 | 0.015309 | 0.07689 | -1 | 0.083906 | 0.042298 | 0.040193 | 0.016705 |
| 153 | 0 | 255 | 0.092842 | 0.047086 | 0.015403 | 0.139927 | 0.092842 | 0.064746 | 0.015403 | 0.157588 | 0 | 0.157588 | 0.092842 | 0.047086 | 0.015403 |
| 17 | 102 | 255 | 0.095345 | 0.073062 | 0.01556 | 0.168407 | 0.095345 | 0.066169 | 0.01556 | 0.161515 | 1 | 0.146406 | 0.086426 | 0.066228 | 0.014105 |

| INPUT | | | OUTPUT | | |
|---|---|---|---|---|---|
| R | G | B | R' | G' | B' |
| 238 | 51 | 51 | 214 | 45 | 45 |
| 170 | 119 | 34 | 170 | 119 | 34 |
| 255 | 34 | 51 | 255 | 34 | 51 |
| 0 | 153 | 17 | 0 | 178 | 21 |
| 170 | 136 | 34 | 184 | 148 | 37 |
| 136 | 153 | 34 | 152 | 171 | 39 |
| 17 | 170 | 17 | 22 | 201 | 22 |
| 153 | 204 | 34 | 153 | 204 | 34 |
| 0 | 255 | 34 | 0 | 255 | 34 |
| 102 | 0 | 170 | 92 | 0 | 154 |
| 34 | 0 | 255 | 35 | 0 | 255 |
| 153 | 0 | 255 | 153 | 0 | 255 |
| 17 | 102 | 255 | 15 | 97 | 244 |

COLOR ADJUSTMENT APPARATUS AND COLOR ADJUSTMENT METHOD

BACKGROUND OF THE INVENTION

Field of the Invention

WM The present invention relates to a color adjustment apparatus and a color adjustment method for performing color adjustment.

Description of the Related Art

There are three types of human retinal cones. These three types of cones have different sensitivities to the wavelength of light, and are called S cones, M cones, and L cones in the order from the peak of sensitivity on the short wavelength side. A person usually has all the S cones, M cones, and L cones, and recognizes colors by the relative ratios of intensities of light sensed by each of the three types of cones. Here, the case of having these three types of cones will be referred to as so-called normal color vision. Classification of Color Universal Design Organization (CUDO), which is a nonprofit organization, refers to the case of having the three types of cones as type C color vision. In contrast, color vision in the case where L cones are missing or there is deviation in sensitivity characteristics of L cones among the three types of cones is referred to as type P color vision in the CUDO classification. In addition, color vision in the case where M cones are missing or there is deviation in sensitivity characteristics of M cones among the three types of cones is referred to as type D color vision in the CUDO classification. Furthermore, color vision in the case where S cones are missing or there is deviation in sensitivity characteristics of S cones among the three types of cones is referred to as type T color vision in the CUDO classification. Color vision in the case where two or three types of cones are missing among L cones, M cones, and S cones is referred to as type A color vision. Those who have color vision characteristics of type P color vision and type D color vision account for over 99% of all the color vision characteristics excluding type C. In Japan, about 5% of men and 0.2% of women have such color vision. Here, there are color combinations that are difficult to be identified depending on the sensitivity characteristics of S cones, M cones, or L, cones. As described above, there are a plurality of types of color vision, and these types of color vision have different combinations of identifiable colors and not-identifiable colors.

As described above, users with color vision deficiencies have colors that are difficult to identify, compared with users who do not have color vision deficiencies. There has been disclosed a method of converting colors that are difficult to be identified by users with color vision deficiencies to easy-to-identify colors (see Japanese Patent Laid-Open No. 2010-183487). The method converts input signals to the LMS color space, and sorts the signals in ascending or descending order of short wavelength (S) component value. The method sets a black point, a white point, and at least one other signal as reference color signals, and applies gamma conversion to the S component of a signal between two adjacent reference color signals among the group of sorted signals.

The technique described in Japanese Patent Laid-Open No. 2010-183487 applies processing only to the S component, which means that the color changes in hue direction. Therefore, when data identifiable by users with color vision deficiencies is generated, that data produces an image whose color representation is greatly different from the input data when that image is viewed by users who do not have color vision deficiencies. That is, the presented details may be different for users with color vision deficiencies and users with no color vision deficiencies.

SUMMARY OF THE INVENTION

A color adjustment method includes: receiving input color values; converting a color space of the input color values to an LMS color space with three elements, the three elements including a long wavelength (L) element, a medium wavelength (M) element, and a short wavelength (S) element; grouping color values in the LMS color space into a plurality of groups based on color vision information, each of the groups including color values determined as approximate based on the color vision information; and adjusting lightness of color values included in each of the groups using a parameter common in that group and different from a different group.

A color adjustment method includes: receiving color vision information; performing color conversion processing; classifying color values included in data according to approximate color; and performing lightness adjustment, wherein: in the classifying, based on the received color vision information, color values with close ratios of two color elements selected from a long wavelength (L) element, a medium wavelength (M) element, and a short wavelength (S) element are classified as approximate colors, and in the performing lightness adjustment, between groups of color values classified as the approximate colors, lightness adjustment is performed so that sums of L and M of LMS color values that have been color-converted based on the color vision information will be apart from each other by a predetermined value or more.

Further features of the present invention will become apparent from the following description of exemplary embodiments with reference to the attached drawings.

BRIEF DESCRIPTION OF THE DRAWINGS

FIG. 5 is a diagram illustrating an example of input color values.

FIG. 6 is a diagram illustrating an example of a list of LMS values for the input color values, and color-vision-converted values.

FIGS. 7A and 7B are diagrams illustrating an example of a color value list for each of groups obtained by grouping.

FIGS. 8A and 8B are diagrams illustrating a color value list for each of groups obtained by grouping, which includes the sorted and lightness-adjusted color values.

DESCRIPTION OF THE EMBODIMENTS

Hereinafter, an embodiment of the present invention will be described using the drawings. Note that the following embodiment is not construed to limit the invention according to the claims, and not all combinations of features described in the embodiment are essential to the solution of the invention.

EMBODIMENT

Coping with color universal design color adjustment processing, which will be described in the present embodiment, is widely applicable to image forming apparatuses that perform printing, such as copy machines, laser printers, and ink jet printers, and to image display apparatuses, such as monitors and projectors. The present embodiment will discuss a multi-functional peripheral (MFP) with the scan function, the print function, the copy function, and the transmission function by way of example.

Hardware Configuration of Image Forming Apparatus

Figure 1:
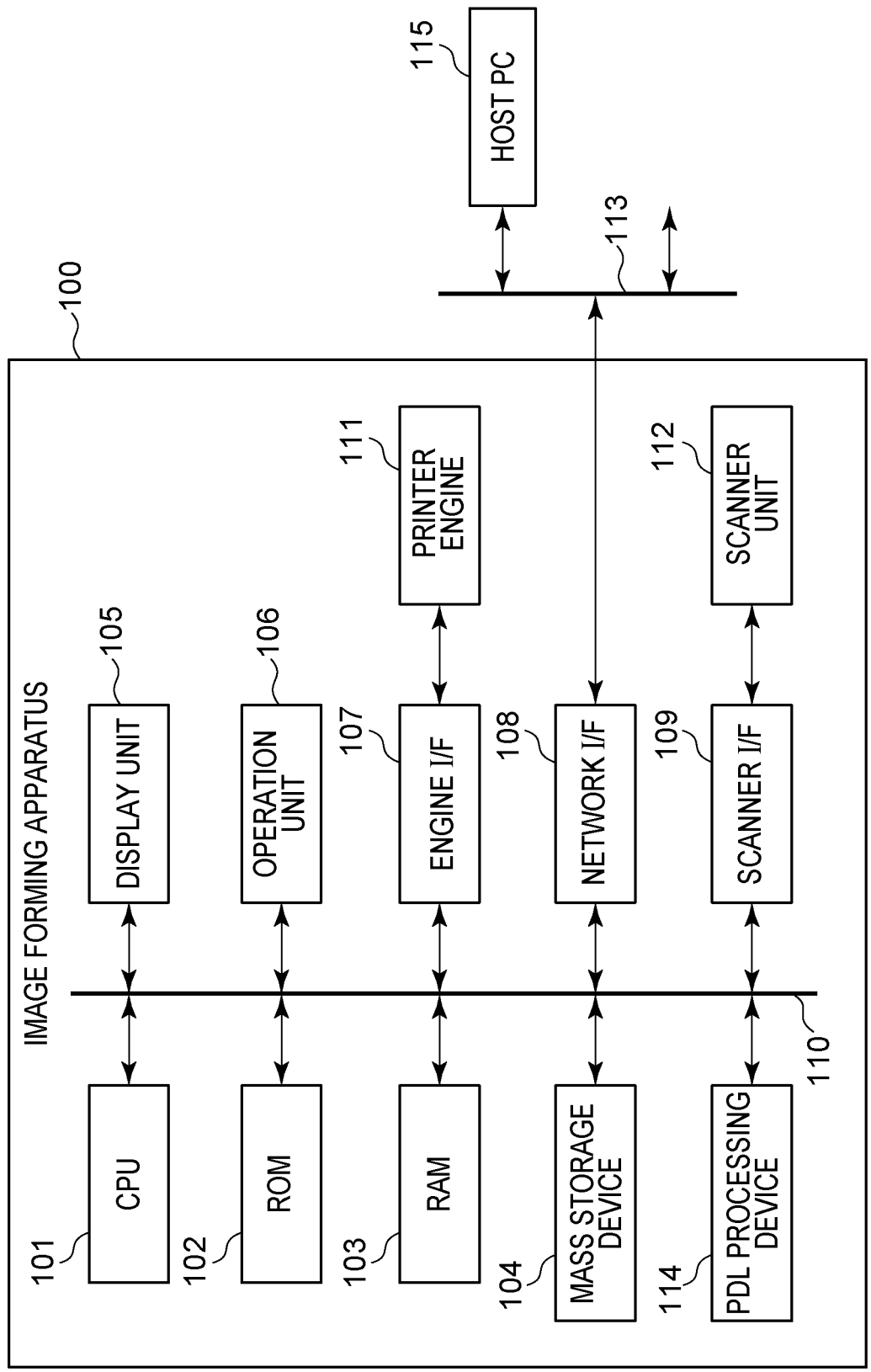
FIG. 1 is a block diagram illustrating the hardware configuration of an image forming apparatus.

FIG. 1 is a block diagram illustrating the hardware configuration of an MFP 100 according to the present embodiment. The MFP 100 includes a central processing unit (CPU) 101, read-only memory (ROM) 102, random-access memory (RAM) 103, a mass storage device 104, a display unit 105, an operation unit 106, an engine interface (I/F) 107, a network I/F 108, a scanner I/F 109, and a PDL processing device 114. These units are interconnected via a system bus 110. In addition, the MFP 100 further includes a printer engine 111 and a scanner unit 112. The printer engine 111 and the scanner unit 112 are connected to the system bus 110 via the engine I/F 107 and the scanner I/F 109, respectively. Note that the PDL processing device 114 may be configured as an image processing device independent of the MFP 100.

The CPU 101 controls the entire operation of the MFP 100. By reading a program stored in the ROM 102 into the RAM 103 and executing the program, the CPU 101 executes various processes described later. The ROM 102 stores a system activation program, a program for controlling the printer engine 111, character data, character code information, and the like. The RAM 103 is volatile random-access memory, and is used as a work area for the CPU 101 and a temporary storage area for various data. For example, the RAM 103 is used as a storage area for storing font data additionally registered by downloading, and an image file received from an external apparatus. The mass storage device 104 is, for example, a hard disk drive (HDD) or a solid-state drive (SSD) where various types of data are spooled, and is used as a storage for programs, information files, image data, and the like, or as a work area.

The display unit 105 includes, for example, a liquid crystal display (LCD), and is used to display the setting state of the MFP 100, the status of processing being executed, an error state, and the like. The operation unit 106 includes hardware keys and an input device such as a touchscreen provided on the display unit 105, and receives an input (command) in response to an operation performed by the user. The operation unit 106 is used to change and reset the setting of the MFP 100, and to set the color adjustment processing mode (color vision information) of the MFP 100 when executing color adjustment processing.

The engine I/F 107 functions as an interface for controlling the printer engine 111 in response to a command given from the CPU 101 when executing printing. An engine control command or the like is transmitted/received between the CPU 101 and the printer engine 111 via the engine I/F 107. The network I/F 108 functions as an interface for connecting the MFP 100 to a network 113. Note that the network 113 may be, for example, a local area network (LAN) or a public switched telephone network (PSTN). The printer engine 111 forms a multicolor image on a recording medium such as a paper sheet using developers (toners) in a plurality of colors (here, four colors, namely, cyan, magenta, yellow, and black (CMYK)) on the basis of image data received from the system bus 110 side. The scanner I/F 109 functions as an interface for controlling the scanner unit 112 in response to a command given from the CPU 101 when reading a document using the scanner unit 112. A scanner unit control command or the like is transmitted/received between the CPU 101 and the scanner unit 112 via the scanner I/F 109. Under control of the CPU 101, the scanner unit 112 reads an image of a document to generate image data, and transmits the image data to the RAM 103 or the mass storage device 104 via the scanner I/F 109.

Configuration of PDL Processing Device

Figure 2:
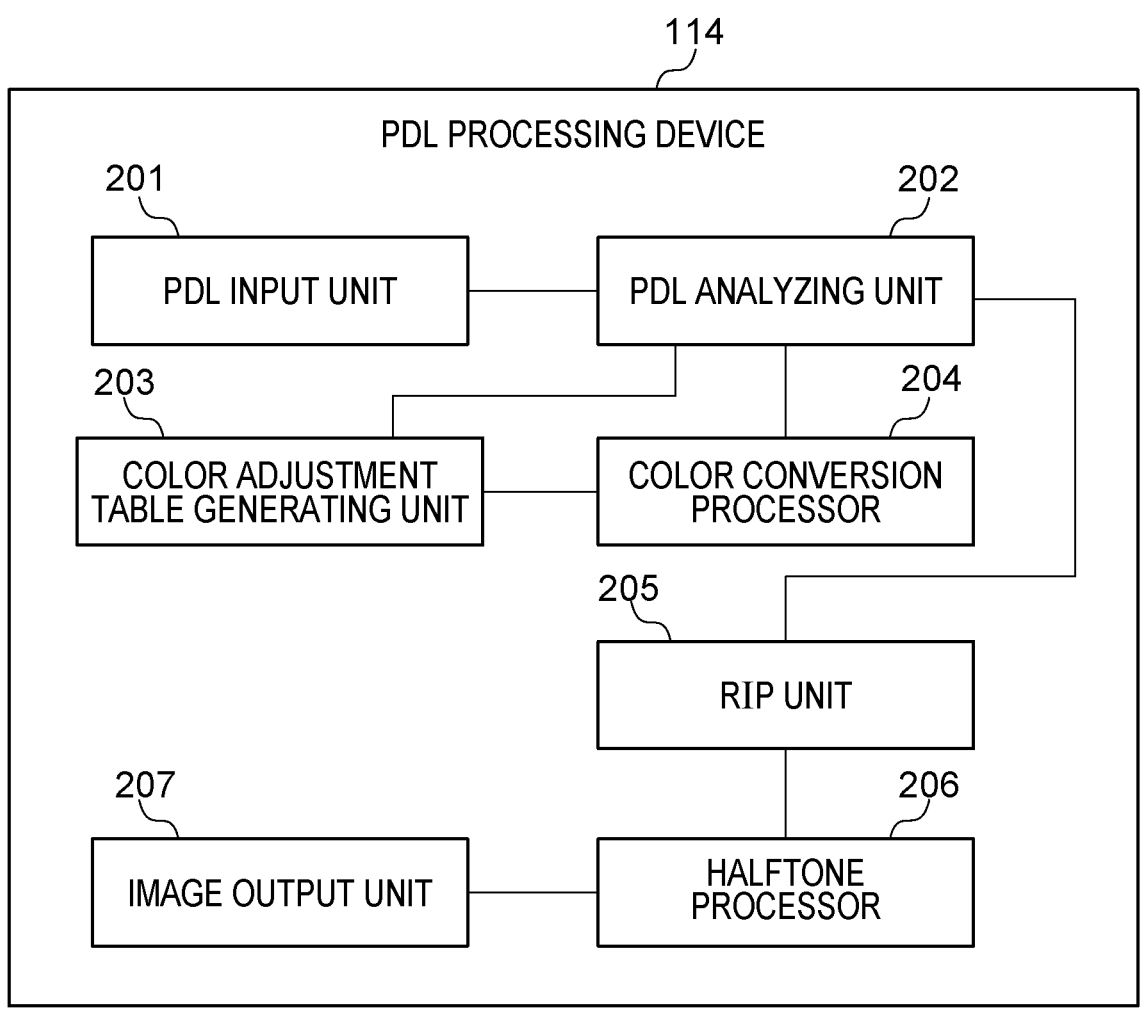
FIG. 2 is a functional block diagram illustrating the internal configuration of a page description language (PDL) processing device.

FIG. 2 is a functional block diagram illustrating the internal configuration of the PDL processing device 114. The PDL processing device 114 includes a PDL input unit 201, a PDL, analyzing unit 202, a color adjustment table generating unit 203, a color conversion processor 204, a raster image processor (RIP) unit 205, a halftone processor 206, and an image output unit 207. The CPU 101 realizes these functional units by reading a program stored in the ROM 102 into the RAM 103 and executing the program.

The PDL input unit 201 receives an input of PDL data to be printed. The input PDL data is, for example, PDL data input from a host personal computer (PC) 115 via the network 113 and the network I/F 108. Alternatively, PDL data stored in the mass storage device 104 may be input. The PDL data input to the PDL input unit 201 is sent to the PDL analyzing unit 202.

The PDL analyzing unit 202 analyzes the input PDL data to obtain information such as characters, figures, images, color values, color processing method, and the like, controls the color adjustment table generating unit 203 and the color conversion processor 204, and generates a control command for the RIP unit 205. The generated RIP control command is sent to the RIP unit 205.

The color adjustment table generating unit 203 generates a color adjustment table for applying color adjustment to color values obtained by an analysis conducted by the PDL analyzing unit 202, on the basis of color vision information specified using the operation unit 106 or obtained by an analysis conducted by the PDL analyzing unit 202.

The color conversion processor 204 uses a color adjustment table generated by the color adjustment table generating unit 203, and a color conversion table stored in the RAM 103 or the mass storage device 104. Accordingly, color conversion processing is applied to color values obtained by an analysis conducted by the PDL analyzing unit 202 and to an image. Hereinafter, the case will be described in which the input color values and the image are in RGB, and the MFP 100 is a multicolor printer that uses general CMYK toners. In this case, the color conversion processor 204 applies the color adjustment table to the color values to perform color adjustment, and then applies the color conversion table to the color values and the image to perform color conversion processing from RGB to CMYK.

The RIP unit 205 generates a CMYK raster image using a RIP unit control command generated by the PDL analyzing unit 202.

The halftone processor 206 applies halftone processing to the CMYK raster image generated by the RIP unit 205. Generally, the printer engine 111 often supports low-number-of-shade outputs, such as outputs with two, four, and sixteen shades. Therefore, the halftone processor 206 performs halftone processing to enable outputs with stable halftone representation even in the case of low-number-of-shade outputs. Note that various methods such as a density pattern method, a systematic dither method, and an error diffusion method are applicable to halftone processing performed by the halftone processor 206. After going through these kinds of processing, image data (print image data) processable by the printer engine 111 is generated.

On receipt of the print image data from the halftone processor 206, the image output unit 207 transmits the print image data to the printer engine 111 via the engine I/F 107. The CPU 101 gives the printer engine 111 a command to form an image based on the print image data. By executing exposure, development, transfer, and fixing processes, the printer engine 111 forms a color image in accordance with an input image on a recording medium.

Configuration of Color Adjustment Table Generating Unit

Figure 3:
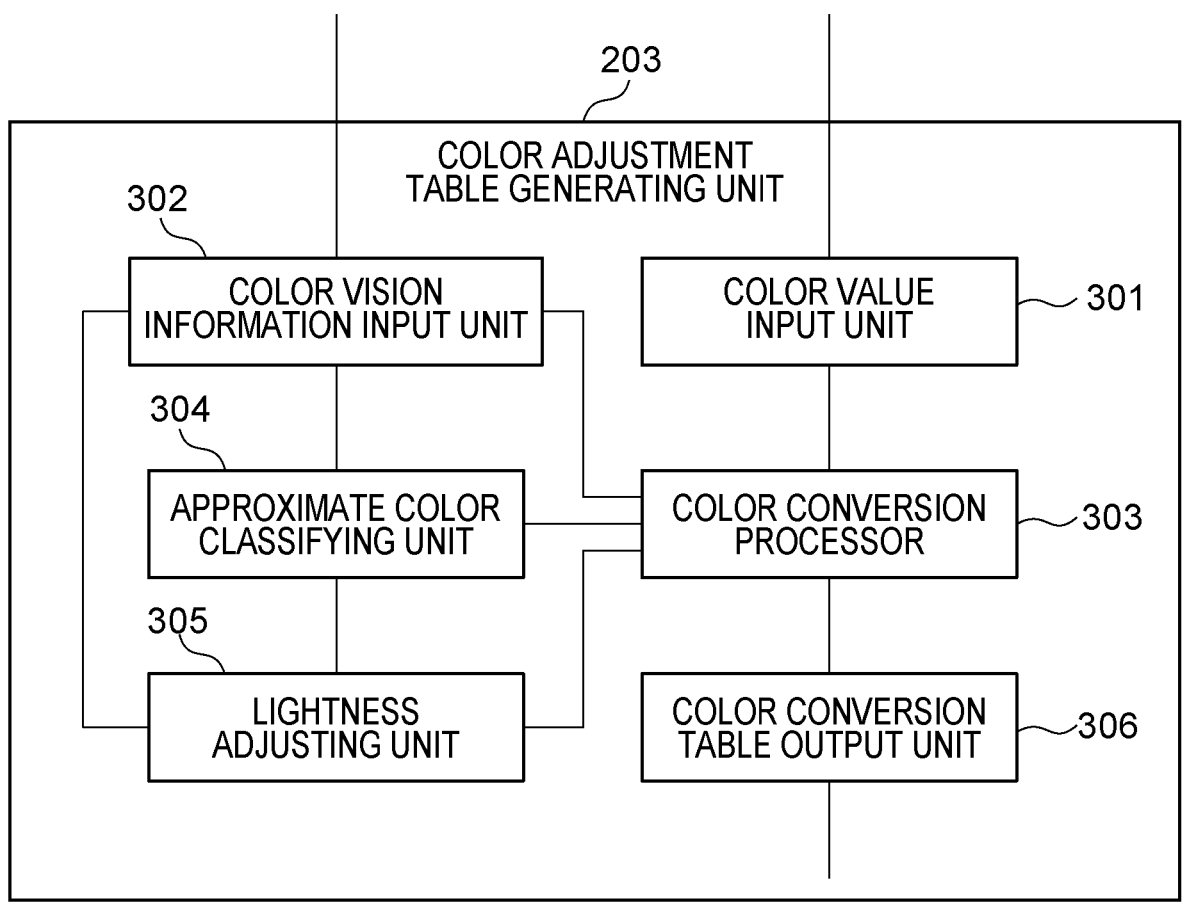
FIG. 3 is a functional block diagram illustrating the internal configuration of a color adjustment table generating unit.

FIG. 3 is a functional block diagram illustrating the internal configuration of the color adjustment table generating unit 203. The color adjustment table generating unit 203 includes a color value input unit 301, a color vision information input unit 302, a color conversion processor 303, an approximate color classifying unit 304, a lightness adjusting unit 305, and a color conversion table output unit 306. The CPU 101 realizes these functional units by reading a program stored in the ROM 102 into the RAM 103 and executing the program.

The color value input unit 301 receives an input of color values from the PDL analyzing unit 202. Color values that are input (input color values) are in, for example, RGB. The color values input to the color value input unit 301 are sent to the color conversion processor 303.

The color vision information input unit 302 receives an input of color vision information from the PDL analyzing unit 202. The input color vision information is in accordance with, for example, the CUDO classification, as in type P, type D, and type C. The color vision information input to the color vision information input unit 302 is sent to the color conversion processor 303 and the approximate color classifying unit 304.

The color conversion processor 303 applies color conversion to the input color values and color values generated inside the color adjustment table generating unit 203. Color conversion includes, for example, color space conversion from sRGB to LMS, color vision conversion from LMS to LMS that reproduces the ability to see colors of each color vision type, and color space conversion from LMS to sRGB. The color-converted color values are sent, along with the color values before being color-converted, to the approximate color classifying unit 304 or the color conversion table output unit 306.

The approximate color classifying unit 304 classifies and groups the color values that have been color-converted to LMS by the color conversion processor 303, on the basis of the color vision information received by the color vision information input unit 302. The grouped color values are sent in units of groups, along with the input color values, to the color conversion processor 303 and the lightness adjusting unit 305.

The lightness adjusting unit 305 determines lightness adjustment values from the LMS values received in units of groups from the approximate color classifying unit 304 and the color-vision-converted LMS values received from the color conversion processor 303, and applies lightness adjustment to the LMS values. The lightness-adjusted color values are sent, along with the input color values, to the color conversion processor 303.

The color conversion table output unit 306 generates a table in which the input color values and the color-converted color values, received from the color conversion processor 303, are associated with each other, and sends the table to the color conversion processor 204.

The above will be summarized as below with some repetitions. Color vision information indicating human color vision characteristics has been disclosed above, which indicates that at least one of sensitivities among a long wavelength (L) element, a medium wavelength (M) element, and a short wavelength (S) element is missing or deviated from a certain value. Based on this color vision information, the CPU 101 performs control for adjusting the lightness of image data so that the distance in the LMS color space between a first color and a second color included in the image data will be greater than or equal to a certain value.

The CPU 101 executes the following: receiving color vision information; performing color conversion processing; and classifying color values included in data according to approximate color.

The CPU 101 further executes: performing lightness adjustment. Furthermore, the CPU 101 classifies, on the basis of the received color vision information, color values with close ratios of two color elements selected from a long wavelength (L) element, a medium wavelength (M) element, and a short wavelength (S) element as approximate colors. The CPU 101 performs lightness adjustment for each of groups of color values classified as approximate colors. Specifically, the CPU 101 performs lightness adjustment so that the sums of L and M of LMS color values that have been color-converted on the basis of the color vision information will be apart from each other by a predetermined value or more. When performing lightness adjustment, the CPU 101 sorts the color values in order of lightness. Furthermore, lightness in the case of sorting in order of lightness may use the LMS color values before being color-converted on the basis of the color vision information.

Furthermore, when performing lightness adjustment, the CPU 101 may not perform lightness adjustment in a case where a lightness difference between the adjusted lightness of a color value that is previous in order of sorting and the lightness of a color value to be adjusted is greater than or equal to a certain value. When performing lightness adjustment, the CPU 101 may perform adjustment so as not to change the ratio among L, M, and S.

When performing classification of approximate colors, if the number of color values belonging to the same group exceeds a certain number, no color adjustment may be performed on the color values belonging to that group. Note that the above-described method may be performed by storing a control program to be executed by the CPU 101, which is an example of a computer, in the mass storage device 104, reading the program into the RAM 103, and executing the program. In addition, the above-described method may be realized by configuring each unit illustrated in FIG. 2 as a circuit, and the circuit may execute the above-described method. The MFP 100, which executes the above-described method, is an example of a color adjustment apparatus.

Generation of Color Adjustment Table

Figure 4:
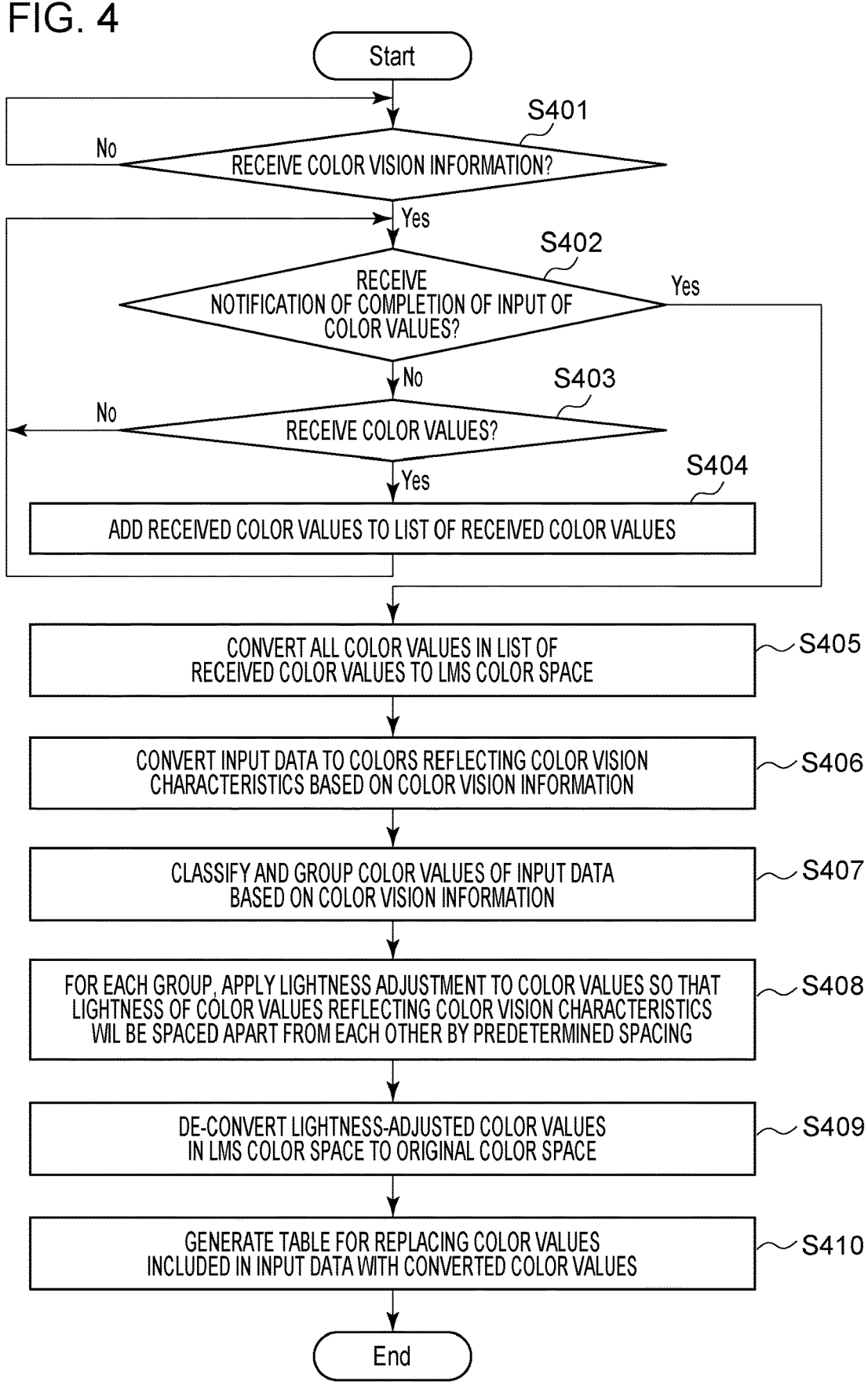
FIG. 4 is a flowchart illustrating the flow of a process performed by the color adjustment table generating unit.

A process of generating a color adjustment table according to the present embodiment will be described. FIG. 4 is a flowchart illustrating the flow of a process performed by the color adjustment table generating unit 203. The CPU 101 realizes a series of processing steps indicated in the flowchart illustrated in FIG. 4 by reading a program stored in the ROM 102 into the RAM 103 and executing the program. Note that the symbol "S" in the following description represents a step. For example, the process starts in response to detection, by the CPU 101, of a certain operation, which corresponds to a start command in FIG. 4, performed by the user on the input device. In response to this certain operation, the screen illustrated in FIG. 10 may be displayed.

Figures 9, 10:
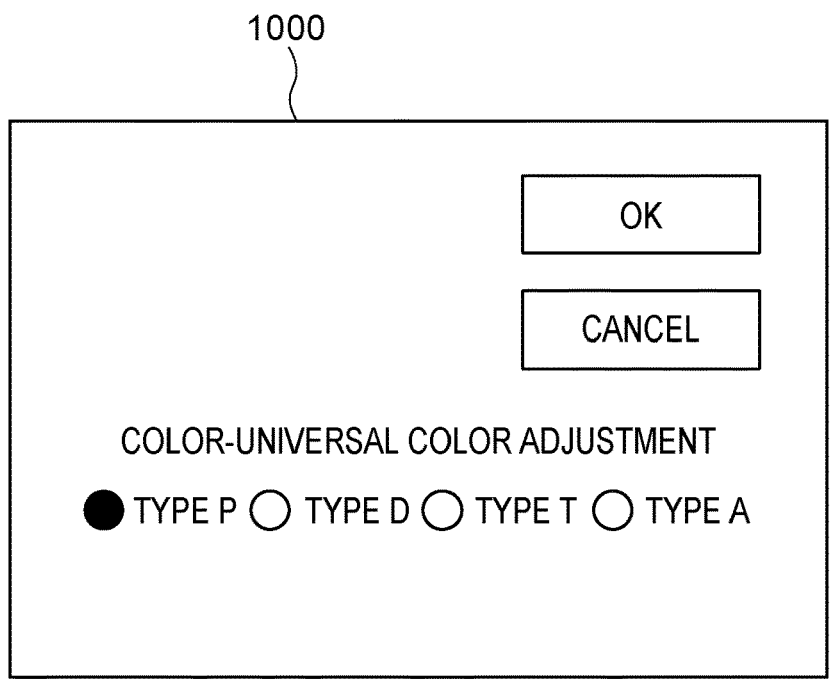
FIG. 9 is a diagram illustrating an example of a color adjustment table.
FIG. 10 is a diagram illustrating an example of a screen for specifying color vision characteristics.

In S401, the color vision information input unit 302 monitors whether color vision information has been input. When the color vision information input unit 302 determines in S401 that color vision information has been input, the color vision information input unit 302 sends the color vision information to the color conversion processor 303, the approximate color classifying unit 304, and the lightness adjusting unit 305, and the process proceeds to S402. The process returns to S401 when the color vision information input unit 302 determines that no color vision information has been input. For example, in S401, color vision information is selected with a radio button on the screen illustrated in FIG. 10. In S401, the process waits for an OK button to be pressed. In response to pressing of the OK button, color vision information input with a radio button is input to the system. Then, the process proceeds to S402. Otherwise, the process may wait for the OK button to be pressed in S401. The case in which type D color vision information has been input will be described hereinafter. As described above, for example, color vision information may be set via a print setting screen on the display unit 105, as in FIG. 10. In the example illustrated in FIG. 10, color vision information may be specified by specifying a radio button corresponding to type D color vision. The selection or specification of color vision information is recognized by the CPU 101. This specification is input to the PDL processing device 114 and is used for later-described processing. FIG. 10 is a diagram illustrating an example of a color vision input screen. Each type of color vision information may be input by selecting a corresponding radio button.

In S402, the color value input unit 301 monitors whether an input of color values has been completed. When an input of color values has not been completed, the process proceeds to S403.

In S403, the color value input unit 301 monitors whether color values have been input. In response to an input of color values, the process proceeds to S404. The case in which values represented in sRGB have been input as color values will be described hereinafter.

In S404, the color value input unit 301 generates an input color value list from the received color values. The color value input unit 301 adds the received color values to the color value list, proceeds to S402, and repeats the processing.

In contrast, when it is detected in S402 that an input of color values has been completed, the color value list is sent to the color conversion processor 303. Then, the process proceeds to S405. The case in which color values of the input color value list illustrated in FIG. 5 have been input will be described hereinafter.

In S405, the color conversion processor 303 performs conversion processing from sRGB to the LMS color space. At first, gamma processing is applied to sRGB by applying the following Formula 1:

When $R(G, B) \leq 0.04045$, $R'(G', B') = R(G, B)/12.92$; and

When $R(G, B) > 0.04045$, $$R'(G', B') = ((R(G, B)+0.055)/1.055)^{2.4} \quad \text{(Formula 1)}$$

Next, the following 3-by-3 matrix (Formula 2) is applied to the gamma-processed R'G'B' to be converted to XYZ:

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R' \\ G' \\ B' \end{pmatrix} \quad \text{(Formula 2)}$$

Furthermore, the following 3-by-3 matrix (Formula 3) is applied to XYZ to be converted to LMS:

$$\begin{pmatrix} L \\ M \\ S \end{pmatrix} = \begin{pmatrix} 0.155 & 0.543 & -0.0329 \\ -0.155 & 0.457 & 0.0329 \\ 0.000 & 0.000 & 0.0161 \end{pmatrix} \begin{pmatrix} X \\ Y \\ Z \end{pmatrix} \quad \text{(Formula 3)}$$

The color conversion processor 303 additionally registers the LMS-converted color values in the input color value list. When color conversion processing of all the color values in the input color value list illustrated in FIG. 5 is completed, the color value list is again sent to the color conversion processor 303, and the process proceeds to S406. FIG. 6 illustrates a color value list obtained by adding the LMS values to the input color value list illustrated in FIG. 5.

In 406, the color conversion processor 303 performs conversion processing from LMS to LMS that reproduces the ability to see colors of each color vision type. LMS that reproduces the ability to see colors of type D is denoted by LdMdSd. The following 3-by-3 matrix (Formula 4) is applied to obtain LdMdSd, and LdMdSd is added to the color value list illustrated in FIG. 6:

$$\begin{pmatrix} Ld \\ Md \\ Sd \end{pmatrix} = \begin{pmatrix} 1.00 & 0.00 & 0.00 \\ 0.49 & 0.00 & 1.25 \\ 0.00 & 0.00 & 1.00 \end{pmatrix} \begin{pmatrix} L \\ M \\ S \end{pmatrix} \quad \text{(Formula 4)}$$

LMS that reproduces the ability to see colors of type P, namely, LpMpSp, is obtained by conversion performed by applying the following 3-by-3 matrix (Formula 5). For example, when type P is selected with a corresponding radio button in FIG. 10, Formula 5 is used instead of Formula 4 to perform processing.

$$\begin{pmatrix} Lp \\ Mp \\ Sp \end{pmatrix} = \begin{pmatrix} 0.00 & 2.02 & -2.52 \\ 0.00 & 1.00 & 0.00 \\ 0.00 & 0.00 & 1.00 \end{pmatrix} \begin{pmatrix} L \\ M \\ S \end{pmatrix} \quad \text{(Formula 5)}$$

When color conversion processing of all the color values in the input color value list illustrated in FIG. 6 to LdMdSd is completed, the color conversion processor 303 sends the color value list to the approximate color classifying unit 304, and the process proceeds to S407.

In S407, the approximate color classifying unit 304 performs grouping processing according to approximate color. From color vision information received from the color vision information input unit 302, two elements to be used for grouping are selected from L, M, and S. Here, because the color vision information is of type D, L and S are selected. Next, using the following Formula (Formula 6), grouping is performed for Ld and Sd illustrated in FIG. 6:

(group number)=$L$÷$S$÷50 (rounded down to the nearest integer) (Formula 6).

The numerical value "50" is stored in the ROM 102 or the mass storage device 104, and is read for execution at the time of calculation. In addition, "50" is only one example, and the numerical value is not limited to "50".

Here, the above-described "Formula 6" is used for Ld and Sd to calculate the group number. The group number is an integer value from 0 to 11. Those of the same group number are grouped together. The following is an example of obtaining the group number.

That is, targets to be grouped are Ld and Sd obtained by applying type D conversion to L and S.

Type D color vision may sometimes have missing or a fewer M cones. Therefore, L and S excluding M are used for grouping. In this grouping, L and S are grouped into twelve groups in hue direction that a type D person is able to discriminate. This is because no lightness adjustment is necessary when the same lightness is discriminated as a color. That is, for type D, numerals of Ld and Sd are used for grouping into twelve groups in hue direction. At that time, "Formula 6" is used. The numeral "50" is an integer value obtained by dividing the maximum value of Ld/Sd by 12 (rounded down to the nearest integer). The value Ld÷Sd is divided by the numeral "50" to obtain an integer value rounded down to the nearest integer. Then, the result becomes a numeral from 0 to 11. Using this numeral, grouping is performed. Note that "50" is only one example, and this numeral may be reduced in order to perform division into finer groups in hue direction. So far is the processing in the case where type D is selected with a corresponding radio button in FIG. 10. Next, the case in which type P is selected in FIG. 10 will also be described.

In the case of type P, M and S are selected, and grouping is performed using the following Formula (Formula 7).

For example, when type P is selected with a corresponding radio button in FIG. 10, Formula 7 is used instead of Formula 6 to perform processing.

(group number)=$M$÷$S$÷12 (rounded down to the nearest integer) (Formula 7)

The numerical value "12" is stored in the ROM 102 or the mass storage device 104, and is read for execution at the time of calculation. In addition, "12" is only one example, and the numerical value is not limited to "12".

Here, for Mp and Sp, the group number is calculated using the above-mentioned Formula 7, and those with close group numbers are grouped together.

In this manner, the color value list illustrated in FIG. 6 is classified into two groups, namely, a color value list illustrated in FIG. 7A and a color value list illustrated in FIG. 7B. In response to completion of approximate color classification processing, the color value lists are sent in units of groups to the lightness adjusting unit 305, and the process proceeds to S408.

In S408, the lightness adjusting unit 305 performs lightness adjustment processing of color values in the color value lists in units of groups. The lightness adjusting unit 305 first measures the lightness of LMS. The lightness is obtained by adding L and M. Next, the color values are sorted in order of lightness for each group. The color values may be sorted in the ascending or descending order of lightness. The case in which the color values are sorted in the ascending order of lightness will be described hereinafter. As a result of sorting the color values in this manner, a color value list illustrated in FIG. 8A and a color value list illustrated in FIG. 8B are obtained. Next, the lightness (Ld+Md) of LdMdSd is obtained, and the average of (Ld+Md) is calculated for each group. The averages of the lightness (Ld+Md) of the color value list illustrated in FIG. 8A and the color value list illustrated in FIG. 8B are 0.325193 and 0.115156, respectively. Next, a parameter specific to each group, an 'addition rate' is obtained for each group. Because nine color values are registered in the color value list illustrated in FIG. 8A, 9÷2=4.5, which is then rounded down to the nearest integer 4. A numeral obtained by subtracting 4 from a numerical value obtained by adding 1 at a time where the top of the list is 0 is determined as an addition rate. Similarly, for the color value list illustrated in FIG. 8B, a numeral obtained by subtracting 4÷2=2 from a numerical value obtained by adding 1 at a time where the top of the list is 0 is determined as an addition rate. Next, the lightness (Ld+Md) is adjusted from the top of the list using the following Formula. The adjusted lightness value (Ld+Md)' is obtained by the following Formula (Formula 8):

($Ld+Md$)'=(average of $Ld+Md$)+(addition rate)×0.03125 (Formula 8).

The numerical value "0.03125" is stored in the ROM 102 or the mass storage device 104, and is read for execution at the time of calculation. In addition, "0.03125" is only one example, and the numerical value is not limited to "0.03125".

However, if the value (Ld+Md) before being lightness-adjusted is greater than a value obtained by adding 0.03125 to the previous adjusted lightness value (Ld+Md)' in the list, the value (Ld+Md) before being lightness-adjusted is applied. The value of Sd' is obtained from the ratio of (Ld+Md)' and (Ld+Md) are obtained as above:

$Sd'=Sd×(Ld+Md)'÷(Ld+Md)$ (Formula 9).

By the way, S=Sd, and similarly, S'=Sd' holds true. Accordingly, S' is obtained. To adjust only lightness without changing hue, the ratio of the LMS values need not be changed. In other words, L' and M' are obtained by the following Formulae (Formula 10 and Formula 11), respectively:

$L'=L×S'/S$ (Formula 10)

$M'=M×S'/S$ (Formula 11)

In this manner, lightness adjustment is performed to obtain the color value lists illustrated in FIGS. 8A and 8B.

The lightness adjusting unit 305 sends the input color values and the lightness-adjusted LMS values in the completed color value lists to the color conversion processor 303, and the process proceeds to S409.

In S409, the color conversion processor 303 performs conversion processing from LMS to the sRGB color space. At first, the following 3-by-3 matrix (Formula 12) is applied to L'M'S' to obtain X'Y'Z':

$$\begin{pmatrix} X' \\ Y' \\ Z' \end{pmatrix} = \begin{pmatrix} 2.948 & -3.503 & 13.184 \\ 1.000 & 1.000 & 0.000 \\ 0.000 & 0.000 & 62.112 \end{pmatrix} \begin{pmatrix} L' \\ M' \\ S' \end{pmatrix} \quad \text{(Formula 12)}$$

Next, the following 3-by-3 matrix (Formula 13) is applied to X'Y'Z' to obtain R"G"B".

$$\begin{pmatrix} R'' \\ G'' \\ B'' \end{pmatrix} = \begin{pmatrix} 3.2410 & -1.5374 & -0.4986 \\ -0.9692 & 1.8760 & 0.0416 \\ 0.0556 & -0.2040 & 1.0570 \end{pmatrix} \begin{pmatrix} X' \\ Y' \\ Z' \end{pmatrix} \quad \text{(Formula 13)}$$

Furthermore, the following Formula (Formula 14) is applied to R"G"B" to apply gamma processing to obtain output color values Rout, Gout, and Bout:

When $R''(G'', B'') > 0.003135$,

Rout (Gout, Bout)=$R''(G'', B'') \times 12.92$; and

When $R''(F-, B'') > 0.003135$,

Rout(Gout, Bout)=$R''(G'', B'')^{1/2.4} \times 1.055 - 0.055$ (Formula 14)

The output color values obtained as above are sent, along with the input color values, to the color conversion table output unit 306, and the process proceeds to S410.

In S410, the color conversion table output unit 306 performs a process of generating a table in which the input color values and the lightness-adjusted output color values are associated with each other. FIG. 9 illustrates a color adjustment table generated by associating the received input color values and output color values. Having finished generating a color adjustment table for all the received color values, the color conversion table output unit 306 stores the color adjustment table in the RAM 103 or the mass storage device 104, and the process ends.

By applying the color adjustment table generated as above to the input color values, the ability of users with color vision deficiencies to discriminate colors may be improved. In addition, because a tone difference from data that has not been color-adjusted may be kept small, while data that has not been color-adjusted is being displayed on a projector, the user may look at a printed matter that has been color-adjusted and be able to discriminate this as the same data. In addition, the number of situations increases in which, for the result displayed on the projector and the result of a printed output matter, the user is able to discriminate a corresponding object simply by mentioning the tone.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™) a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2018-246312, filed Dec. 27, 2018, which is hereby incorporated by reference herein in its entirety.

What is claimed is:

1. A color adjustment method comprising:
    receiving input color values corresponding to an input image;
    converting a color space of the input color values to an LMS color space with three elements, the three elements including a long wavelength (L) element, a medium wavelength (M) element, and a short wavelength (S) element;
    grouping color values in the LMS color space into a plurality of groups based on color vision information, each of the groups including color values determined as approximate based on the color vision information;
    adjusting lightness of color values included in each of the groups; and
    instructing an image output device to apply said adjusted lightness of color values to said input image.

2. The color adjustment method according to claim 1 wherein adjusting lightness of color values included in each of the groups is performed using a parameter specific to that group.

3. The color adjustment method according to claim 1 further comprising:
    receiving color vision information;
    wherein:
    in the classifying, based on the received color vision information, color values with close ratios of two color elements selected from a long wavelength (L) element, a medium wavelength (M) element, and a short wavelength (S) element are classified as approximate colors, and
    in the performing lightness adjustment, between groups of color values classified as the approximate colors, lightness adjustment is performed so that sums of L and M of LMS color values that have been color-converted based on the color vision information will be apart from each other by a predetermined value or more.

4. The color adjustment method according to claim 1, wherein, when performing lightness adjustment, the color values are sorted in order of lightness.

5. The color adjustment method according to claim 4, wherein, in the performing lightness adjustment, lightness in a case of sorting in order of lightness uses LMS color values before being color-converted based on the color vision information.

6. The color adjustment method according to claim 1, wherein, when performing lightness adjustment, no lightness adjustment is performed in a case where a lightness difference between adjusted lightness of a color value that is previous in order of sorting and lightness of a color value to be adjusted is greater than or equal to a certain value.

7. The color adjustment method according to claim 1, wherein, when performing lightness adjustment, adjustment is performed so as not to change a ratio among L, M, and S.

8. The color adjustment method according to claim 1, wherein, when performing approximate color classification, if a number of color values belonging to an identical group exceeds a certain number, no color adjustment is performed on the color values belonging to the identical group.

9. A color adjustment apparatus comprising:
an input unit that receives input color values corresponding to an input image;
a converter that converts a color space of the input color values to an LMS color space with three elements, the three elements including a long wavelength (L) element, a medium wavelength (M) element, and a short wavelength (S) element;
a grouping unit that groups color values in the LMS color space into a plurality of groups based on color vision information, each of the groups including color values determined as approximate based on the color vision information;
an adjustment unit that adjusts lightness of color values included in each of the groups; and
an output unit that instructs an image output device to apply said adjusted lightness of color values to said input image.

* * * * *